United States Patent

[11] 3,604,904

| [72] | Inventors | Ariel I. Stiebel<br>Bloomfield Hills;<br>Seymour A. Lippmann, Huntington Woods,<br>both of Mich. |
|---|---|---|
| [21] | Appl. No. | 796,974 |
| [22] | Filed | Feb. 6, 1969 |
| [45] | Patented | Sept. 14, 1971 |
| [73] | Assignee | Radex Corporation<br>Detroit, Mich. |

[54] MONITORING DEVICE
18 Claims, 10 Drawing Figs.

[52] U.S. Cl. .................................................. 235/92 PD,
235/92 NT, 235/92 R, 235/183, 235/92 LG, 73/91
[51] Int. Cl. ............................................. G07c 3/10
[50] Field of Search ......................................... 235/92, 27,
59, 65, 52, 183; 73/91

[56] References Cited
UNITED STATES PATENTS

| 2,903,185 | 9/1959 | Myers ........................... | 235/183 |
| 3,329,806 | 7/1967 | McCauley ..................... | 235/92 |
| 3,372,379 | 3/1968 | Collom et al. ................. | 235/92 X |
| 3,409,762 | 11/1968 | O'Brien et al. ................ | 235/92 |
| 3,441,718 | 4/1969 | Hatherell et al. ............. | 235/92 |

Primary Examiner—Maynard R. Wilbur
Assistant Examiner—Joseph M. Thesz, Jr.
Attorney—Hauke, Gifford & Patalidis ABSTRACT: A monitoring device specially adapted for production control purpose by providing one count for each workpiece produced by a machine, such as a forge hammer or the like, which requires an indefinite number of strokes or motions in order to produce a finished workpiece. The total energy consumed by the machine for producing a finished workpiece is transduced into an electrical signal comprising a first train of electrical pulses of a first amplitude duration ratio, corresponding to the working cycle of the machine, followed by a second train of second electrical pulses of a lower amplitude duration ratio, corresponding to the idling cycle of the machine. Those signals are integrated by appropriate means supplying at its output a voltage level varying between a maximum level corresponding to the first train of pulses and a minimum level corresponding to the second train of pulses. The minimum voltage level is used to set a control means which is in turn activated by a voltage level corresponding to approximately the maximum level, and each time the control means is activated, a count is registered. Additionally, diverse indicators are provided for monitoring production cycles of the machine, down time cycles, and for providing a permanent record of production rates.

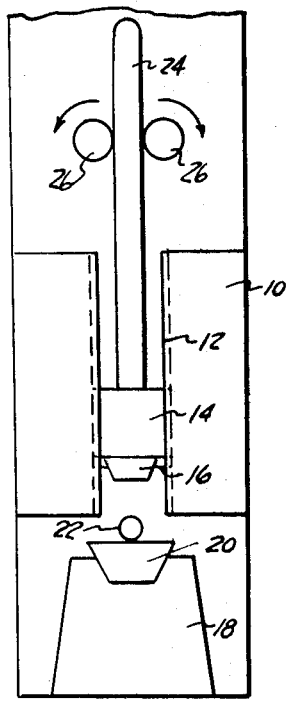
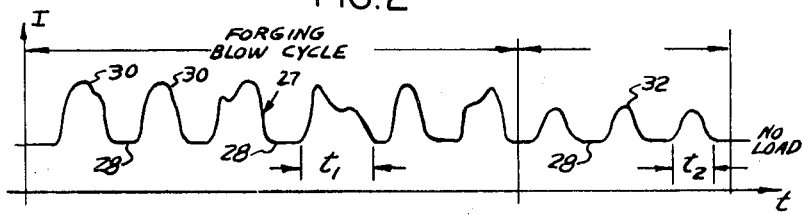
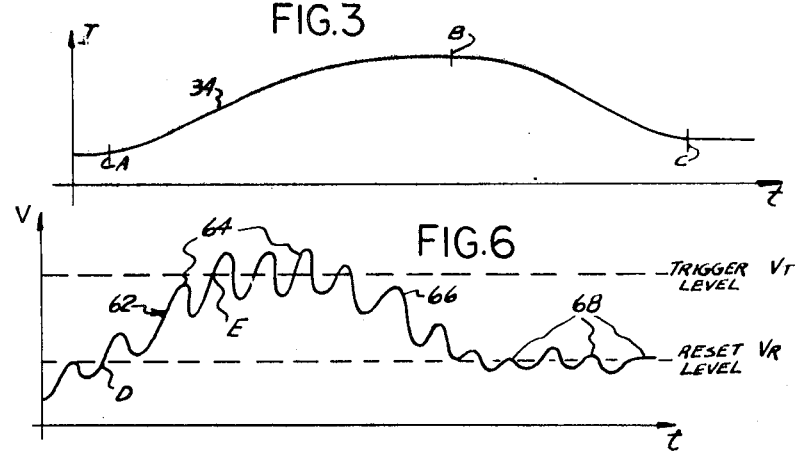
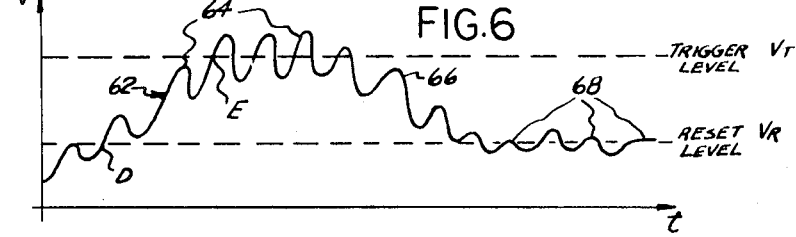
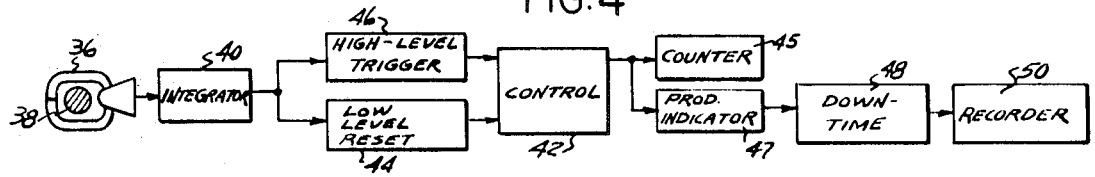
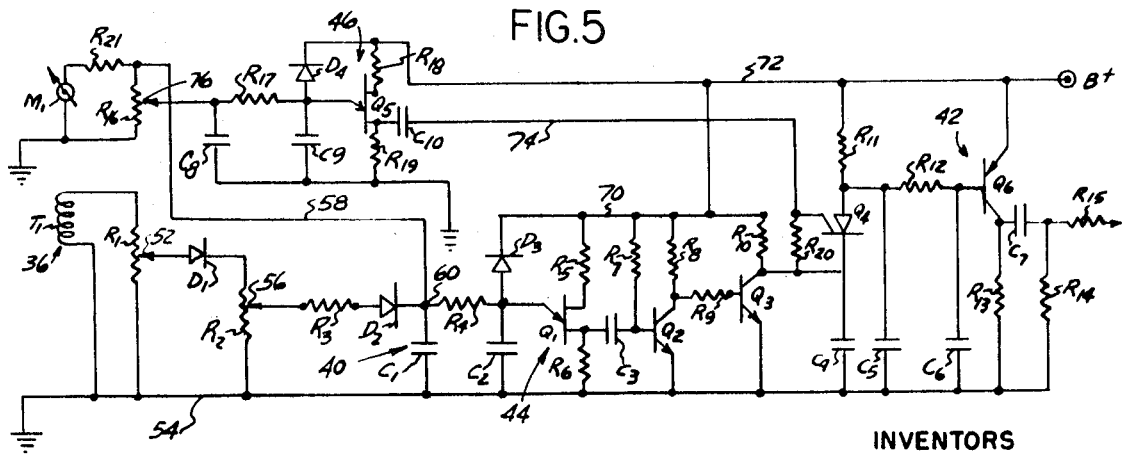
INVENTORS
ARIEL I. STIEBEL
SEYMOUR A. LIPPMANN
ATTORNEYS

MONITORING DEVICE

BACKGROUND OF THE INVENTION

In industrial processes it is imperative to count the exact number of parts or workpieces produced over certain periods of time. An accurate part count is needed for inventory purpose, payroll accounting and efficiency studies. In order to render the count tamper-proof, it is advantageous to obtain such a count without human participation. Such count is obtained if at all feasible by means of counters actuated by a moving element of the production machine, or by counting means such as those using photocell detectors, magnetic detectors and the like, disposed in the path of a part chute or conveyor. A typical example of counting means in the stamping industry consists of a unit counter actuated, for example, by the ram of a punch press and which registers one count each time the ram is reciprocated, on the assumption that each reciprocation of the ram corresponds to the production of a finished workpiece.

However, some methods of production do not conveniently lead to an accurate system for counting produced workpieces. An example of industry where automatic counting represents almost unsurmountable difficulties is clearly illustrated by the forging industry wherein, for lack of any better counting system, the operators of forge hammers still use the primitive method of chalking on a board, or on the side of the forge hammer, each part as it is forged. It goes without saying that such a method is extremely unreliable and leads to tampering, specially when the operator's basic pay is based upon production rates.

The difficulties encountered by automatic counting of forged parts are immediately apparent when a forge hammer is observed in operation. In order to forge a workpiece, several blows by the hammer are required to shape the workpiece properly The number of blows, constituting the so-called blow cycle, may very from a workpiece to the next, the blow cycle being dependent on the temperature of the workpiece. If forging is effected at a high temperature, less blows are needed than if forging is effected at a lower temperature. It is therefore obvious that the number of blows can not be used for a correct piece count.

Optical counting devices, for example devices adapted to detect the presence of a hot forging in the hammer by means of a photocell arrangement are not able to withstand the extreme environment of a forge plant. Furthermore, such devices lend themselves to easy tampering.

SUMMARY OF THE INVENTION

The present invention provides a monitoring system capable of giving an accurate count of workpieces, such as, for example, forged parts, regardless of the number of strokes, blows or the like, of the tool which are required for producing each finished part. In addition, the present invention provides a production control or monitoring system furnishing an immediate indication of the normal functioning of production machines such as forge hammers and an immediate indication of the unproductive cycles or downtimes, with further ancillary recording means providing a permanent record of production rates. The many objects and advantages of the present invention will become apparent when the following description of some of the best modes contemplated for practicing the invention, for production control and monitoring of forge hammers for example, is considered in conjunction with the accompanying drawings wherein like numbers refer to like parts and in which:

BRIEF DESCRIPTION OF THE DRAWINGS:

FIG. 1 is a schematic representation of a board drop hammer;

FIG. 2 is a graph representing an example of a drop hammer drive motor electrical current waveform, in the course of a normal working cycle followed by a nonworking cycle;

FIG. 3 is a graphic representation of a curve illustrating an integration in function of time of the electric current waveform of FIG. 2;

FIG. 4 is a schematic representation, in a block diagram for, of an example of a monitoring device according to the present invention;

FIG. 5 is a circuit diagram representing a position of the monitoring device of FIG. 4;

FIG. 6 is a graph representing the electrical signals appearing at the output of the integrating portion of the circuit diagram of FIG. 5;

DETAILED DESCRIPTION OF THE INVENTION

Figure 7:
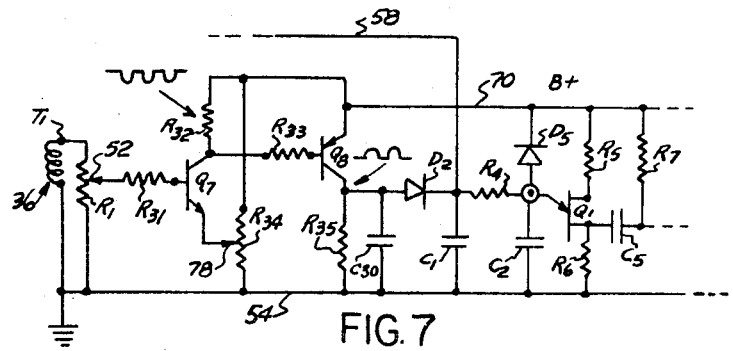
FIG. 7 is a representation of a partial modification of the circuit diagram of FIG. 5.

The present invention has particular application as a monitoring device for the production, among others, of forged parts or workpieces produced by means of forge hammers, as previously mentioned, and will be hereinafter described in details, for illustrative purpose only, in applications relating to board drop-hammers utilizing an electrical drive motor, and to compressed air or steam operated drop-hammers.

As schematically shown at FIG. 1, a board drop-hammer comprises a vertical frame 10 having appropriate parallel slides of guides 12 arranged to support for reciprocation a ram 14 carrying an upper die 16 mounted at the lower end thereof. Below the ram 14 is disposed an anvil 18 on the top of which is mounted a lower die 20. The upper and lower dies have registering working faces provided with appropriate complementary shapes in the form of cavities, pockets, and the like, adapted to shape a workpiece 22 by repeated blows to the workpiece disposed between the upper and lower dies. A board 24 is attached to the upper portion of the ram 14 and is adapted to be driven by means of a pair of rolls 26 driven in opposite direction by an electric motor, not shown. The rolls 26 are adapted to be displaced in opposite directions away from the surface of the board 24, and towards the board as controlled by the hammer operator, such that when the rolls 26 are in engagement with the surface of the board 24, the board is caused to move upward, therefore lifting the ram 14 and the upper die 14 attached thereto. When the ram 16 reaches the top of its stroke, the rolls 26 are separated and the ram is free to fall down by gravity and to impart, through the upper die 16, forming energy to the workpiece 22, and wasted energy to the lower die 20 and the anvil 18 supporting the lower die. Means, not shown, are provided for holding the ram 14 at the top of its stroke, but as long as the hammer operator depresses the control threadle of the hammer, the ram is continuously lifted and dropped, thus continuously hammering the workpiece 22 between the upper and lower dies until the workpiece is formed to shape.

As long as the workpiece 22 is not completely shaped, an important portion of the energy imparted by the dripping ram 14 and the upper die 16 is utilized for shaping the hot workpiece such that the ram hardly bounces after causing the upper die to strike the workpiece, the workpiece 22 being substantially soft, as a result of having been previously heated at a high temperature so as to facilitate the forging action of the dies. In view of the lack of rebound of the ram 14, a considerable amount of energy must be expanded by the hammer-driving motor during the forging blow cycle in order to lift the ram to the top of its stroke. However, if there is no workpiece disposed between the upper and lower dies or, alternately, as soon as the workpiece becomes shaped to its ultimate shape, the dies being caused to close completely and impact upon each other, there results a substantial elastic rebound of the ram 14, which thus requires a lesser amount of energy for being lifted back to the top of its stroke.

If the electric current utilized for driving a board drophammer is recorded as a function of time, the waveform is substantially as represented at FIG. 2 by waveform 27. Examination of the waveform of FIG. 2 immediately reveals that for each stroke of the forging blow cycle the electrical current furnished to the hammer drive motor varies from a minimum no-load current level as shown by portion 28 of the waveform to a maximum intensity as shown at 30.

During the die-on-die cycle, i.e. without any workpiece in the die or when the workpiece is completed, in view of the rebound of the ram the current variation of the driving motor for each stroke of the ram is of a much lesser amplitude from the no-load value 28 to a maximum peak 32.

In addition, it is also apparent that each period of time during which the electric motor is caused to absorb current above its no-load current is of longer duration for each stroke of the forging blow cycle, as shown at $t_1$, than for each stroke of the die-on-die cycle, in view of the greater amount of rebound during the latter, and as shown at $t_2$ in FIG. 2.

The diverse current surges of the waveform 27 of FIG. 2 may be mathematically integrated in a curve as ideally represented in FIG. 3 at 34, which shows three particular distinctive points, point A representing the starting point of the forging cycle, point B being the maximum amplitude to which the curve 34 rises, and point C denoting the end of the blow cycle where the amplitude is equal to A, with no useful work being accomplished.

The present invention is capable of integrating the various energy levels absorbed by the driving means of a forge hammer, to provide a count for each workpiece that is forged and to provide additional information, if so required, for the purpose of production control, by means of an arrangement schematically illustrated in a block diagram form at FIG. 4. The electrical current flowing into the electric motor driving the forge hammer is sensed by means of a transducer 36 of the type generally used in association with clip-on ammeters, and which is adapted to clip around an electric wire or lead 38 of the forge hammer motor. The clip-on transducer 36 supplies a signal voltage at its output which is fed into an integrator 40 providing at its output a voltage signal rising from a minimum level corresponding to the die-on-die or idling cycle of the hammer to a maximum level corresponding substantially to the end of the forging blow cycle. Such voltage signal at the output of integrator 40 is adapted to set a control 42 through a low level reset arrangement 44 and to activate the control 42 through a high level trigger arrangement 46. Upon actuation of control 42 a count is registered by counter 45, and control 42 is inhibited from registering another count until reset by low level reset arrangement 44 when the voltage level at the output of integrator 40 reaches a value corresponding substantially to the die-on-die or idle energy absorbed by the hammer motor. Additionally, control 42 is adapted to activate a production indicator 47 providing a visual or graphic representation of whether or not the forge hammer is producing at a preestablished rate, and to further actuate a downtime indicator 48 and a permanent production recorder 50, if so desired.

As shown in more details in FIG. 5, representing a typical example of a portion of a practical application of the present invention, pickup transducer 36 induces in a coil $T_1$ and in a load resistor $R_1$ connected in series therewith through a common grounded line 54 a voltage which is proportional to the current absorbed by the hammer drive motor. In the form illustrated at FIG. 5, load resistor $R_1$ is a potentiometer having a slider 52 connected through a diode $D_1$ to a terminal of a second potentiometer $R_2$ having its other terminal grounded by way of common ground line 54. The variable voltage appearing across potentiometer $R_1$, or a portion of potentiometer $R_1$ according to the position of slider 52 thus used to adjust the sensitivity of the device, is rectified by diode $D_1$ and appears across potentiometer $R_2$. A second adjustment is provided by slider 56 of potentiometer $R_2$ and a portion of the voltage appearing across potentiometer $R_2$ is applied through a limiting resistor $R_3$ and a diode $D_2$ to one side of a capacitor $C_1$ having its other side connected to ground. Diode $D_2$ permits current to flow so as to charge capacitor $C_1$, but prevents current to flow in an opposite direction. The charging rate of capacitor $C_1$ is determined by the value of resistor $R_3$, and capacitor $C_1$ is capable of discharging to ground via a line 58 through a parallel network consisting of a potentiometer $R_{16}$ shunted by a resistor $R_{21}$ and a meter $M_1$. Consequently, the rate of charge of capacitor $C_1$ is determined by the value of resistor $R_3$ and the position of sliders 52 and 56 of, respectively, potentiometers $R_1$ and $R_2$, while its discharge rate is determined by the equivalent resistance of the parallel network formed by potentiometer $R_{16}$, resistor $R_2$ and meter $M_1$. In this manner, a voltage charge can be accumulated on capacitor $C_1$ at an adjustable rate and the accumulated voltage may be discharged at a different rate. Preferably, the charging rate of capacitor $C_1$ is adjusted so as to be about three times faster than its discharge rate during the forging blow cycle of the forge hammer. Consequently, the voltage level at connection 60 follows substantially and averages, or integrates, the peaks of voltage corresponding to the electrical current absorbed by the hammer driving motor during forging operation, but does not fall rapidly between the peaks, resulting in a voltage waveform substantially as shown at 62 in FIG. 6, every peak shown at 64 representing a forging peak, terminating, as shown at 66, in decreasing peaks corresponding to the beginning of the die-on-die or idling cycle of the hammer, and terminating in small substantially constant peaks 68 corresponding to the nonworking cycle.

Capacitor $C_1$, which with its associated components defines the integrator of FIG. 4, is connected to a relaxation oscillator comprising a unijunction $Q_1$ having its emitter connected through a resistor $R_4$ to capacitor $C_1$ and a capacitor $C_2$ connected between the unijunction emitter and ground. Base-two of unijunction $Q_1$ is placed at a predetermined voltage by being connected through bias resistor $R_5$ to B+ voltage supply via a line 70 in turn connected to the B+ line 72. A resistor $R_6$ is connected between base-one of unijunction $Q_1$ and ground. A diode $D_3$ connected between the emitter of unijunction $Q_1$ and B+ line 70 prevents current from flowing from the B+ line to the emitter of the unijunction and to capacitor $C_2$ connected thereto such that the charge of capacitor $C_2$ is representative of the charge of capacitor $C_1$ being applied across capacitor $C_2$ through resistor $R_4$. The emitter of unijunction of $Q_1$ is thus normally reverse biased until the voltage across capacitor $C_2$ reaches the peak point voltage of unijunction $Q_1$, in the neighborhood of 7 volts for example, at which point the emitter of unijunction $Q_1$ becomes forward biased and the dynamic resistance between the emitter and base-one of the unijunction drops to a low value. Capacitor $C_2$ then discharges through the emitter base-one circuit, and a voltage pulse appears at the junction between base-one of the unijunction $Q_1$ and resistor $R_6$ caused by the current flowing through resistor $R_6$. As soon as the emitter of unijunction $Q_1$ reaches a predetermined minimum voltage in view of capacitor $C_2$ having discharged, the emitter base-one circuit ceases to conduct and the cycle is repeated. The pulses appearing at the junction between base-one of unijunction $Q_1$ and resistor $R_6$ are applied through a coupling capacitor $C_3$ to the base of an NPN transistor $Q_2$.

Transistor $Q_2$ has its emitter grounded, its collector connected to B+ line 70 through a load resistor $R_8$, and its base forwardly biased by way of a resistor $R_7$ connected between the B+ line 70 and the base, such that transistor $Q_2$ having its base normally forward biased conducts heavily because of the base current flowing through resistor $R_7$. Under such normal condition, with current flowing through collector load resistor $R_8$, the junction between resistor $R_8$ and the collector of transistor $Q_2$ is almost at ground potential, and this almost ground potential voltage is applied through a resistor $R_9$ to the base of a second NPN transistor $Q_3$, having its emitter grounded and its collector connected through a load resistor $R_{10}$ to the B+ line 70, thus causing transistor $Q_3$ to be cut off. Therefore, as long as transistor $Q_2$ is conducting, transistor $Q_3$ in nonconducting and vice versa. Consequently, as soon as pulses from the relaxation oscillator circuit of unijunction $Q_1$ appear at the base of $Q_2$, $Q_2$ becomes nonconductive and the base of transistor $Q_3$ is pulled to a voltage level that causes transistor $Q_3$ to conduct. As long as transistor $Q_3$ does not conduct, the voltage at the junction of the collector of transistor $Q_3$ and resistor $R_{10}$ is at a voltage which is about the voltage of B+ line 72, but as soon as transistor $Q_3$ conducts, the voltage at the junction becomes approximately ground level.

The collector of transistor $Q_3$ is connected to the cathode of an SCR $Q_4$, insulated from ground by way of a capacitor $C_4$ connected between ground and the cathode of SCR $Q_4$. The anode of SCR $Q_4$ is connected to the B+ line 72 through a resistor $R_{11}$, and it is obvious that when transistor $Q_3$ is nonconducting, the cathode of the SCR $Q_4$ is also approximately at the same B+ voltage, being connected to B+ line 70 through resistor $R_{10}$. Under those conditions, even if the gate of SCR $Q_4$ where to receive a pulse SCR $Q_4$ could not fire. The anode of SCR $Q_4$ is connect through a resistor $R_{12}$ to the base of a PNP transistor $Q_6$, having a load resistor $R_{13}$ connected between its collector and ground, and having its emitter connected to the B+ line 72. Thus, normally the base of transistor $Q_6$, being connected to B+ line 72 through resistors $R_{12}$ and $R_{11}$ is substantially at the same voltage as the emitter of the transistor, and causes the transistor to be turned off.

The gate of SCR $Q_4$ is connected by a line 74 to the base-one of a second unijunction $Q_5$ through a capacitor $C_{10}$. The base-one of unijunction $Q_5$ is also connected to ground through a load resistor $R_{19}$, while its base-two is connected to the B+ line 72 through a resistor $R_{18}$. The emitter of unijunction $Q_5$ is connected to the slider 76 of potentiometer $R_{16}$ through a resistor $R_{17}$. A capacitor $C_9$ is connected between the emitter of unijunction $Q_5$ and ground such that a second unijunction oscillator is thus formed, diode $D_4$ between the emitter of the unijunction and the B+ line 72 preventing current from flowing therebetween.

When the forge hammer begins to forge, the voltage level across capacitor $C_1$ is substantially as shown in FIG. 6 at the left hand portion of curve 62, such voltage passing alternately through minimum and maximum levels but generally increasing as shown. When the voltage across capacitor $C_1$ reaches a value corresponding substantially to point D of curve 62, i.e. corresponding to a predetermined voltage VR hereinafter referred to as reset voltage level, the relaxation oscillator of unijunction $Q_1$ begins to oscillate, causing in turn transistor $Q_2$ to stop conducting on each negative cycle. This in turn causes transistor $Q_3$ to conduct on each negative cycle, thus bringing the junction of its collector and resistor $R_{10}$ to almost ground potential. The junction between the collector of transistor $Q_3$ and resistor $R_{10}$ is held at that almost ground potential as long as unijunction $Q_1$ is oscillating because of the presence of capacitor $C_4$, connected between the collector of transistor $Q_3$ and ground, which then becomes discharged almost to ground potential and can not charge fast enough to follow the oscillations of the relaxation oscillator of unijunction $Q_1$. This in turn brings the cathode of SCR $Q_4$ to ground potential, and in view of the fact that the anode of SCR $Q_4$ is at B+ voltage, the SCR is now ready to fire provided a pulse is supplied to its gate.

The voltage across capacitor $C_1$ continues to oscillate during the work cycle of the forge hammer, generally increasing as shown at FIG. 6, until the voltage at slider 76 of potentiometer $R_{16}$ reaches a value, as shown at point E of FIG. 6, arbitrarily designated as trigger level VT, at which point that trigger voltage level is applied across the emitter base-one junction of unijunction $Q_5$. The trigger voltage level VT is chosen as the peak point voltage of the unijunction $Q_5$ such that the emitter thereof becomes forward biased and the dynamic resistance between the emitter and base-one drops to a low value. The relaxation oscillator formed by unijunction $Q_5$ thus begins to oscillate, and a pulse appearing across load resistor $R_{19}$ is transmitted through coupling capacitor $C_{10}$ and line 74 to the gate of SCR $Q_4$, casing SCR $Q_4$ to fire. As transistor $Q_3$ is normally in a conducting state, current flows from B+ line 72 to ground line 54 through resistor $R_{11}$, the anode cathode circuit of SCR $Q_4$, and the collector emitter circuit of transistor $Q_3$. The voltage drop across resistor $R_{11}$ is applied through resistor $R_{12}$ to the base of transistor $Q_6$, thus causing transistor $Q_6$ to conduct. The voltage pulse thus appearing across the collector load resistor $R_{13}$ of transistor $Q_6$ is transmitted through a resistor $R_{15}$ to the remaining section of the circuit for a purpose as will be explained hereinafter.

Once the SCR $Q_4$ has been fired it remains conducting, even though the operation of the forge hammer may cause the voltage across capacitor $C_1$ to fluctuate above and below the triggering point for the relaxation oscillator of unijunction $Q_5$. However, as the forging blow cycle ends, the die-on-die cycle of the forge hammer requiring less current to be supplied to the drive motor of the hammer causes the voltage across capacitor $C_1$ to fall as shown by the right-hand portion of wave curve 62 of FIG. 6, such that the emitter voltage of unijunction $Q_1$ falls to a value which, in spite of its fluctuation, does not reach the peak point voltage of the unijunction, with the result that the oscillator of unijunction $Q_1$ stops when the voltage level across the capacitor $C_1$ reaches a value slightly below that of the reset level VR, thereby causing the cathode of the SCR $Q_4$ to return to the B+ potential, thereby turning the SCR $Q_4$ into a nonconductive state. Therefore, the circuit of FIG. 5 provides two discrete levels, which are adjustable as previously explained through the sliders of potentiometers $R_1$ and $R_2$, and $R_{16}$ respectively, so as to provide an appropriate reset level VR, FIG. 6, for first turning off the SCR $Q_4$ in the course of the downward excursion of the variable voltage across the capacitor $C_1$ and for resetting the SCR $Q_4$ in the course of the consecutive upward excursion of the variable voltage and a trigger level VI for triggering the SCR $Q_4$, in such a manner that for every forging blow cycle, the circuit is first set, or made ready to operate, such that when a sufficiently high energy blow is provided, the resulting voltage level passes through the trigger level, thus causing a pulse to appear at the output of the circuit of FIG. 5, such pulse being utilized to operate counting means and other equipment as hereinafter explained. The circuit sensitivity is adjusted by way of the potentiometer sliders, observing the voltage excursions by means of meter $M_1$ in the course of actual forging during setup. The circuit of FIG. 5 represents a practical example of the integrator 40, low level reset 44, high level trigger and control portions 46 and 42 of FIG. 4.

FIG. 7 represents a modification of a portion of the circuit of FIG. 5 designed to increase the sensitivity of the integrator portion of the circuit. For that purpose, the portion of the voltage appearing across the potentiometer $R_1$ which is tapped by means of slider 52 is applied through a resistor $R_{31}$ to the base of an NPN transistor $Q_7$ having its emitter connected to a voltage divider formed by potentiometer $R_{34}$ connected across B+ line 70 and ground, and having a slider 78, connected to the emitter of the transistor, such that the emitter may be placed to any appropriate voltage between the B+ voltage and ground. The collector of transistor $Q_7$ is connected through a load resistor $R_{32}$ to B+ line 70. The transistor $Q_7$ is biased in such manner that it will conduct only if its emitter is at a lower voltage than its base. The slider 78 of potentiometer $R_{34}$ is adjusted so as to prevent conduction of transistor $Q_7$, with a voltage appearing across potentiometer $R_1$ corresponding to the forge hammer drive motor idling. Any voltage surge, resulting from the forge hammer being operated, is applied through resistor $R_{31}$ to the base of the transistor $Q_7$ thus causing it to conduct causing in turn a voltage drop across load resistor $R_{32}$. The junction of the load resistor $R_{32}$ and of the collector of $Q_7$ is connected through a resistor $R_{33}$ to the base of a PNP transistor $Q_8$ having its collector connected to ground through load resistor $R_{35}$ and its emitter connected to B+ line 70. Transistor $Q_8$ is normally in a nonconductive state, but as soon as a voltage is applied through resistor $R_{33}$ to its base, it is caused to conduct, and the voltage appearing across load resistor $R_{35}$, shunted by capacitor $C_{30}$, is applied through diode $D_2$ across capacitor $C_1$, in the same manner and for the same purpose as explained hereinbefore, the rest of the circuit being also the same as hereinbefore described in detail.

The increase of sensitivity of the circuit of the invention due to the modification of FIG. 7 may be explained as follows:

If it is assumed that the forge hammer drive motor consumes, while idling, 60 amps and the average motor current during forging is 60.6 amps, this represents a current change of 1 percent average during forging. By using the circuit of FIG. 7, the initial 60 amps idling current may be effectively blocked out such that a change in current of 0.6 amps represents a change of 100 percent. Consequently, by appropriate adjustment of the positions of the sliders of potentiometers $R_1$ and $R_{34}$, FIG. 7, the sensitivity of the monitoring device of the invention may be adequately adjusted, thereby increasing the efficiency and full-proof quality of the monitoring device.

In forge hammers which are actuated by compressed air or steam, the ram holding the upper die is attached to a piston disposed in an appropriate cylinder, and air or steam is introduced into the lower portion of the cylinder for displacing the piston upwardly, thereby lifting the ram and the upper die attached thereto, in a manner quite similar to the manner in which a board forge hammer ram is lifted by the electric motor driven rolls. Air or steam is used only to lift the ram to the top of its stroke, at which time, the air or steam is exhausted from the lower portion of the cylinder, thus causing the ram to fall freely by gravity for striking the workpiece disposed between the upper and lower dies. A larger quantity of air or steam is required to lift the ram when the hammer is forging a hot workpiece. The variation in air or steam intake follows closely the variation of current requirement for a board forge hammer, and is due to the same reasons. While forging, the hammer upper die and ram experience a cushioning effect resulting from the energy spent for shaping the hot workpiece disposed between the upper and lower dies, and come almost to a dead stop. A greater amount of air or steam is thus required to lift the ram and upper die during the return stroke. If the hammer is not forging, or if the workpiece through repeated blows has been appropriately forged to its definite shape, the impact between the upper die and the lower die causes the ram to rebound, and less air or steam is utilized to return the ram to the upper end of its stroke.

Figure 8:
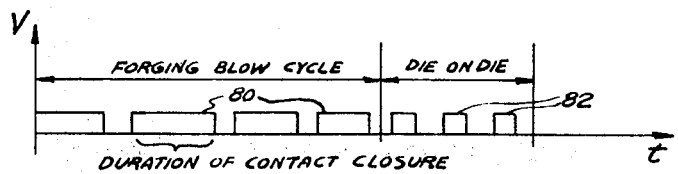
FIG. 8 is a graphic representation of a typical electrical signal as provided by a fluid flow transducer connected in the exhaust of a compressed air or steam forge hammer.

The amount of air or steam expelled at the exhaust from the work cylinder is therefore an indication of the amount of energy required to forge a workpiece. In order to monitor the operation of an air or steam forge hammer, a flow-measuring transducer is placed in the exhaust line from the hammer work cylinder. The flow-measuring transducer closes an electrical contact as long as air is flowing through it. A typical example of such a flow-measuring device or transducer is a flow switch, Model FS-925-M, manufactured by Gems Company, Inc. of Farmington, Conn. If the flow switch is connected across a voltage supply, there results through the switch and circuits associated thereto a constant voltage electrical current pulse for each reciprocation of the forge hammer ram which is proportional, in time duration, to the duration of air or steam flow at the exhaust of the hammer work cylinder. A series or train of pulses as shown at 80 at FIG. 8 is thus obtained during the forging blow cycle, and a series or train of pulses, as shown at 82, each having a much shorter time duration than each pulse 80, are produced during the die-on-die cycle.

Figure 9:
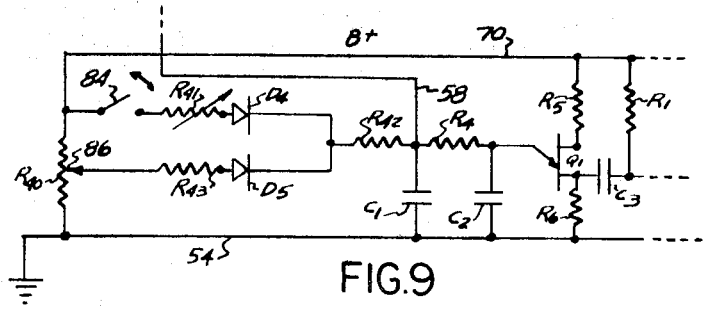
FIG. 9 is a circuit diagram of a modification of a portion of the invention utilizing a fluid flow transducer.

The flow switch, as shown at 84, in FIG. 9, is disposed at the input of a circuit substantially alike the circuits herein described with reference to FIGS. 5 and 7. As shown in FIG. 9, the flow switch 84 has one of its terminals connected to the B+ line 70 and its other terminal connected through a variable resistor $R_{41}$, a diode $D_4$ and a resistor $R_{42}$ to one end of the capacitor $C_1$. A potentiometer $R_{40}$ is connected between B+ line 70 and ground line 54 and has a slider 86 connected through a resistor $R_{43}$ and a diode $D_5$ to the common junction between diode $D_4$ and resistor $R_{42}$. Adjustment of the slider 86 of potentiometer $R_{40}$ places a predetermined charge upon capacitor $C_1$ which determines the sensitivity of the device, and each time flow switch 84 closes, the higher voltage of B+ line 70 is applied across capacitor $C_1$, through variable resistor $R_{41}$, diode $D_4$ and limiting resistor $R_{42}$, such that capacitor $C_1$ becomes charged to a level depending both from the voltage of the B+ supply which is constant, and the duration of each closing of the flow switch 84, which is longer for each blow of the forging blow cycle than for each of the die-on-die cycle. In this manner, capacitor $C_1$ functions as the integrator 40 of FIGS. 4, 5 and 7, although, in this arrangement, the voltage level across capacitor $C_1$ is time dependent rather than time and voltage dependent as in the arrangements of FIGS. 5 and 7. Slider 86 of potentiometer $R_{40}$ is adjusted so as to place across capacitor $C_1$ a preset voltage slightly below the reset voltage. The voltage across capacitor $C_1$ is thus caused to effectuate excursions through the reset voltage level and the higher trigger level in the same manner as previously explained in detail. The remaining of the circuit of FIG. 9 is in all points identical to the circuit of FIG. 5, and its operation is also alike.

As previously explained, for each forging blow cycle of the forge hammer, regardless of the length of the blow cycle and of the length of the die-on-die cycle, one pulse and one pulse alone is supplied at the output of the circuit of FIG. 5, corresponding to the output of the control means 42 of FIG. 4, and such a pulse is applied through resistor $R_{15}$ to the input of a utilization circuit, which, as shown at FIG. 4, may include in addition to a counter 45 a production indicator 47, a downtime indicator 48 and a recorder 50. An example of utilization circuit is illustrated in the circuit diagram of FIG. 10.

Figure 10:
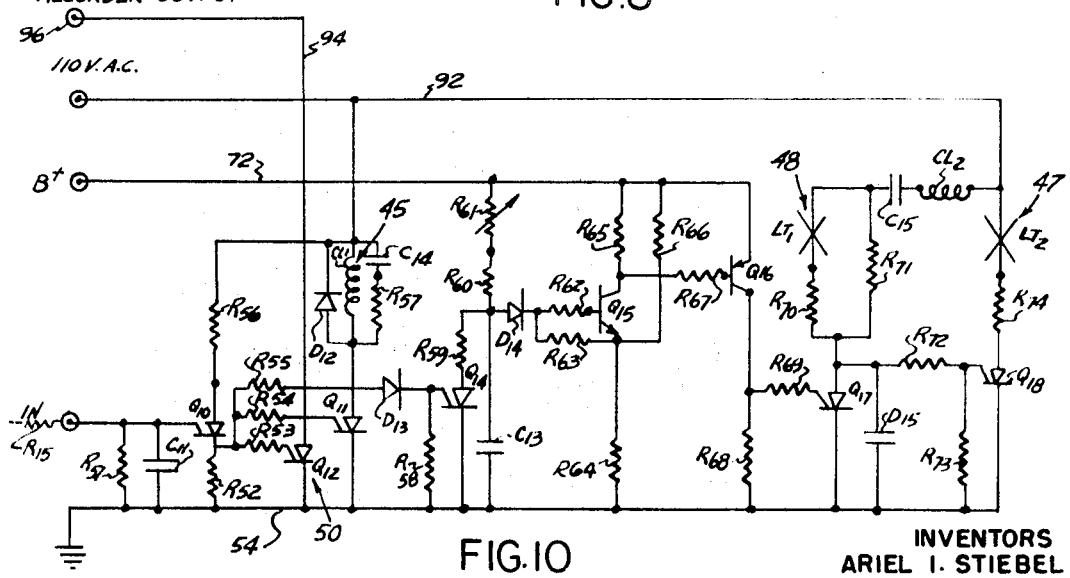
FIG. 10 is a circuit diagram of a portion of the monitoring device shown in a block diagram form in FIG. 4.

As shown in FIG. 10, the output pulse is applied across a resistor $R_{51}$ at the input of a utilization circuit. The voltage pulse across resistor $R_{51}$, shunted by capacitor $C_{11}$, is applied to the gate of an SCR $Q_{10}$. The cathode of the SCR $Q_{10}$ is grounded through a resistor $R_{52}$ and its anode is connected through a limiting resistor $R_{56}$ to a 110 volt AC line 92. A second SCR $Q_{11}$ has its cathode grounded and its anode connected through the coil $CL_1$ of a counter 45 to the AC line 92. The gate of the SCR $Q_{11}$ is tied to the cathode of the SCR $Q_{10}$ through a resistor $R_{54}$. The SCRs $Q_{10}$ and $Q_{11}$ being placed across a 110 volt AC source do not conduct as long as their respective gates do not receive a positive pulse. When the gate signal is removed they automatically cut off by being immediately quenched on the next negative half cycle.

A pulse applied at the gate of the SCR $Q_{10}$ turns the SCR $Q_{10}$ on. A pulse appears across resistor $R_{52}$ which is applied to the gate of the SCR $Q_{11}$ which is thereby turned on. Current flows through the coil $C_1$ which operates the counter 45 to register a count. Resistor $R_{57}$ and capacitor $C_{14}$ shunting coil $CL_1$ supply enough current to the coil during the negative half cycles for preventing shattering of the counter relay and possible double counts. A shunting diode $D_{12}$ prevents harmful inductive surges which could damage the SCR $Q_{11}$.

Since SCR $Q_{11}$ is placed across an AC source, it ceases to conduct as soon as the gate signal disappears, and is thus made ready for the next pulse to appear at the input of the circuit.

An SCR $Q_{12}$ has its cathode grounded and its anode connected through a line 94 to an output 96 to which, if so desired, a recorder such as a chart recorder may be connected. The recorder provides an appropriate voltage above ground to line 94, but the cathode anode circuit of the SCR $Q_{12}$ is normally in an off condition, unless a pulse appearing across the resistor $R_{52}$ in the cathode circuit of the SCR $Q_{10}$ is applied through a resistor $R_{53}$ to the gate of SCR $Q_{12}$. When this happens, i.e. each time the SCR $Q_{10}$ conducts as a result of an input pulse being applied to its gate, SCR $Q_{12}$, is caused to conduct, and thus to actuate the recorder. The pulse thus appears as a line on a chart such as may be used by the recorder. Any appropriate type of strip chart recorder, such as, for example, an Esterline Angus event recorder, or the like, may be used, connected to terminal 96.

As further illustrated in the circuit diagram of FIG. 10, an SCR $Q_{14}$ is connected between the B+ line 72 and ground, resistors $R_{59}$ and $R_{60}$ and variable resistor $R_{61}$ being disposed in series in its anode circuit. The gate of the SCR $Q_{14}$ is biased by means of a resistor $R_{58}$ connected between the gate and ground, and the cathode of SCR $Q_{10}$ is connected to the gate of of SCR $Q_{14}$ through limiting resistor $R_{55}$ and diode $D_{13}$. A capacitor $C_{13}$ is connected between ground and the junction of resistors $R_{59}$ and $R_{60}$, and the voltage appearing across capacitor $C_{13}$ is applied through a diode $D_{14}$ and a resistor $R_{62}$ to the base of an NPN transistor $Q_{15}$. The emitter of transistor $Q_{15}$ is connected to ground through a resistor $R_{64}$ and to the junction between diode $D_{14}$ and resistor $R_{62}$ through a resistor $R_{63}$. A resistor $R_{66}$ is connected between the emitter of the transistor $Q_{15}$ and the B+ line 72, such that the resistors $R_{66}$ and $R_{64}$ form a voltage divider for placing the emitter of transistor of $Q_{15}$ at a predetermined voltage. A load resistor $R_{65}$ is connected between the collector of transistor $Q_{15}$ and the B+ line 72. The collector of transistor $Q_{15}$ is connected through a resistor $R_{67}$ to the base of a PNP transistor $Q_{16}$ having its emitter connected to the B+ line 72 and its collector connected through a load resistor $R_{68}$ to ground. The collector of transistor $Q_{16}$ is further connected through a resistor $R_{69}$ to the gate of an SCR $Q_{17}$ having its cathode connected to ground and its anode connected through a resistor $R_{70}$ to one end of an indicator light $LT_1$, the other end of which is connected through a capacitor $C_{15}$ to one end of the motor coil $CL_2$ of a timer, clock or other elapsed time-indicating device. The other end of motor coil $CL_2$ is connected to the 110 volt AC line 92. A resistor $R_{71}$ is connected in parallel so as to shunt both resistor $R_{70}$ and indicator light $LT_1$.

A reversely disposed diode $D_{15}$ is connected between the cathode and the anode of the SCR $Q_{17}$, and the anode of the SCR $Q_{17}$ is connected through a resistor $R_{72}$ to the gate of an SCR $Q_{18}$ which is appropriately biased by way of a resistor $R_{73}$ disposed between its gate and ground. The cathode of the SCR $Q_{18}$ is connected to ground and its anode is connected through a resistor $R_{74}$ to one end of an indicating light $LT_2$, the other end of which is connected to the 110 AC line 92.

As previously explained, a pulse appearing at the input of the circuit of FIG. 10 causes the SCR $Q_{10}$ to momentarily conduct such that a voltage pulse appears across load resistor $R_{52}$. This voltage pulse is applied through resistor $R_{55}$ and diode $D_{13}$ to the gate of the SCR $Q_{14}$ which is thus caused to conduct. When the SCR $Q_{14}$ conducts, the capacitor $C_{13}$ which is normally charged from B+ line 72, through the adjustable resistor 61 and resistor 60, is caused to discharge through resistor $R_{59}$ and the anode cathode circuit of the SCR $Q_{14}$. The adjustment of adjustable resistor $R_{61}$ determines the rate of charging of capacitor $C_{13}$, and the frequency of the discharge the capacitor is determined by the frequency at which the SCR $Q_{14}$ is caused to conduct, every time a pulse is applied to the gate thereof. The frequency of discharge of capacitor $C_{13}$ therefore corresponds to the frequency of production of forged workpieces by the hammer. As the positive side of the capacitor $C_{13}$ is connected through diode $D_{14}$ and resistor $R_{62}$ to the base of transistor $Q_{15}$, as long as capacitor $C_{13}$ is repeatedly discharged 0 a predetermined rate of frequency, the voltage across capacitor $C_{13}$ never reaches a value sufficient to cause transistor $Q_{15}$ to be turned on. As long as transistor $Q_{15}$ is off, no voltage appears at the base of transistor $Q_{16}$, such that transistor $Q_{16}$ is off, but as soon as transistor $Q_{15}$ conducts, a voltage appears across its collector load resistor $R_{65}$ and this voltage is in turn applied through resistor $R_{67}$ to the base of transistor $Q_{16}$ which is turned on. As soon as transistor $Q_{16}$ is turned on, a voltage appears across its collector load resistor $R_{68}$ and this voltage is applied through a resistor $R_{69}$ to the gate of the SCR $Q_{17}$ thus turning the SCR $Q_{17}$ on. SCR $Q_{17}$ being on, capacitor $CL_{15}$ is now able to discharge through the parallel network of resistor $R_{71}$ and resistor $R_{70}$ and indicator light $LT_1$, and the anode to cathode circuit of the SCR $Q_{17}$ on each positive half cycle of the 110 volt AC supply and to charge through diode $D_{15}$ and the parallel network on each negative half cycle, such that current flows through indicator light $LT_1$, which is turned on, and through the motor coil $CL_2$, thus starting the cumulative time indicator. In this manner, downtime is recorded and the turning on of indicator light $LT_1$ indicates that the forge hammer is not producing at a predetermined rate or is not producing at all.

Adjustable resistor $R_{61}$ is adjusted so as to provide a rate of charging of capacitor $C_H$ providing an appropriate time delay, for example 30 seconds, below which the charge on the capacitor is insufficient to cause transistor $Q_{15}$ to conduct.

As long as the SCR $Q_{17}$ is not conducting, the SCR $Q_{18}$ is conducting As long as the SCR $Q_{17}$ is not conducting, current flowing through diode $D_{15}$ and resistor $R_{21}$ on each negative half cycle of the 110 voltage supply causes condenser $C_{15}$ to charge on each such negative half cycle, and to discharge on each positive half cycle through resistor $R_{71}$, resistor $R_{72}$ and resistor $R_{73}$. Part of this current flows through the gate of SCCR $Q_{18}$, or alternately expressed, the voltage caused by the current flow through resistor $R_{73}$ is applied to the gate of SCR $Q_{18}$, thus causing SCR $Q_{18}$ to conduct, such that current flows from the 110-volt AC line 92 through indicator light $LT_2$, resistor $R_{74}$, and the anode to cathode circuit of the SCR $Q_{18}$. Under those conditions, which correspond to a state of nonconductance for SCR $Q_{17}$, which in turn corresponds to a predetermined number of pulses within a predetermined period of time being supplied to the input of the circuit, indicator light $LT_2$ remains on, thus indicating that the forge hammer is producing at a predetermined rate. When the forge hammer is stopped for a period of time sufficient to permit the charge across capacitors $C_{13}$ to reach a predetermined value, as previously explained transistor $Q_{15}$ is turned on, which in turn turns on transistor $Q_{16}$, which in turn turns on SCR $Q_{17}$, SCR $Q_{17}$ being turned on, the junction between the anode thereof, diode $D_{15}$ and resistor $R_{72}$ is pulled to a voltage substantially at ground level, causing a cessation of gate current into the SCR $Q_{18}$. On the first negative half cycle, the SCR $Q_{18}$ is thus turned off, and indicator light $LT_2$ is extinguished.

It can thus be seen that the present invention provides a monitoring system capable of providing a visual display of the production rate of a machine, such as a forge hammer and the like, capable of providing a count for each workpiece produced, of turning on an alarm signal such as an indicator light indicating that a predetermined production rate is not met, of turning on a downtime cummulative meter or recorder, and further capable of providing a permanent graphic record of production.

Having thus described the invention, by way of illustrative examples thereof, what is sought to be protected by United States Letters Patent is as follows.

We claim:

1. A monitoring device for giving one count for each occurrence of a first train of electrical pulses of a predetermined amplitude duration ratio followed by a second train of electrical pulses of a lower amplitude duration ratio, said device comprising integrating means adapted to accept said pulses at its input and to supply at its output a voltage level increasing to a maximum level corresponding to the occurrence of said first train of pulses and decreasing to a minimum level corresponding to the occurrence of said second train of pulses, normally off switch means connected to the output of said integrating means, said switch means being adapted to be set at a voltage slightly above said minimum level, to be turned on at a voltage slightly below said maximum level and to be turned off at a voltage slightly below said minimum level, counting means activated by said switch means for registering one count each time said switch means is turned on, normally on indicator means operatively connected with said counter means, a normally charged capacitor adapted to be discharged each time said counter means is operated, and control means connected across said capacitor for turning said indicator means off when the voltage across said capacitor reaches a predetermined value.

2. The monitoring device of claim 5 wherein said integrating means comprises essentially a capacitor adapted to be charged by said electrical pulses and to discharge through a resistor network comprising an adjustable resistor for adjusting the time constant of said integrating means.

3. The monitoring device of claim 1 further comprising normally off indicator means and control means for said normally off indicator means connected across said capacitor for turning said indicator means on when the voltage across said capacitor reaches a predetermined value.

4. The monitoring device of claim 3 further comprising normally off cummulative elapse time recording means operatively adapted to be turned on by said control means.

5. The monitoring device of claim 1 wherein the amplitude of said first train of electrical pulses is equal to the amplitude of said second train of electrical pulse.

6. A production-monitoring device for giving one count for each workpiece produced by a machine whose operation for producing a workpiece results in the occurrence of a first train of electrical pulses of a predetermined amplitude duration ratio followed by a second train of electrical pulses of a lower amplitude duration ratio, said device comprising integrating means comprising essentially a capacitor adapted to be charged by said pulses and to be discharged through a resistor network for defining a voltage level increasing to a maximum level corresponding to the occurrence of said first train of pulses and decreasing to a minimum level corresponding to the occurrence of said second train of pulses, voltage sensitive control means connected to the output of said integrating means, said control means being adapted to be set at a voltage slightly above said minimum level, to be actuated at a voltage slightly below said maximum level and to be turned off at a voltage slightly below said minimum level, counting means activated by said control means for registering one count each time said control means is actuated, normally on indicator means operatively connected with said counter means, a normally charged capacitor adapted to be discharged each time said counter means is operated, and control means connected across said capacitor for turning said indicator means off when the voltage across said capacitor reaches a predetermined value, whereby said indicator means remains on as long as said counter means is operated above a predetermined rate.

7. The device of claim 6 wherein said integrating means comprises essentially a capacitor is adapted to discharge through a resistor network comprising an adjustable resistor for adjusting the time constant of said integrating means.

8. The device of claim 6, further comprising normally off indicator means and control means for said normally off indicator means connected across said capacitor for turning said indicator means on when the voltage across said capacitor reaches a predetermined value, whereby said indicator means is turned on hen said counter means is operated below a predetermined rate.

9. The device of claim 8 further comprising normally off cummulative elapse time recording means operatively adapted to be turned on by said control means, whereby said elapse time recording means provides an indication of nonproductive time.

10. The device of claim 9 further comprising additional recording means providing a permanent graphic record each time a count is registered.

11. The monitoring device of claim 6 wherein the amplitude of said first train of electrical pulses is equal to the amplitude of said second train of electrical pulse.

12. A production-monitoring device for a machine whose operation for producing a workpiece results in the occurrence of a first train of electrical pulses of a predetermined amplitude duration ratio followed by a second train of electrical pulses of a lower amplitude duration ratio, said device comprising integrating means comprising essentially a capacitor adapted to be charged by said pulses and to be discharged through a resistor network for defining a voltage level increasing to a maximum level corresponding to the occurrence of said first train of pulses and decreasing to a minimum level corresponding to the occurrence of said second train of pulses, normally off switch means at the output of said integrating means, enabling means for said switch means, low-voltage sensing means at the output of said integrating means for activating said enabling means upon sensing a voltage slightly above said minimum level and for turning off said switch means upon sensing a voltage slightly below said minimum level, high-voltage sensing means at the output of said integrating means for turning on said switch means upon sensing a voltage slightly below said maximum level, and utilization means activated by said switching means.

13. The production monitoring device of claim 12 wherein the amplitude of said first train of electrical pulses is equal to the amplitude of said second train of electrical pulses.

14. The device of claim 12 wherein said integrating means comprising essentially a capacitor is adapted to discharge through a resistor network comprising an adjustable resistor for adjusting the time constant of said integrating means.

15. The device of claim 12 wherein said utilization means comprises counting means.

16. The device of claim 12 wherein said utilization means comprises normally on indicator means adapted to be turned off when said switch means remains off for a predetermined period of time.

17. The device of claim 12 wherein said utilization means comprises normally off second indicator means adapted to be turned on when said switch means is turned on and off below a predetermined rate.

18. The device of claim 12 wherein said low voltage sensing means is a first relaxation oscillator biased to oscillate when said voltage reaches said low level, and said high voltage sensing means is a second relaxation oscillator biased to oscillate when said voltage reaches said high level.

UNITED STATES PATENT OFFICE
CERTIFICATE OF CORRECTION

Patent No. 3,604,904            Dated September 14, 1971

Inventor(s) ARIEL I. STIEBEL ET AL

It is certified that error appears in the above-identified patent and that said Letters Patent are hereby corrected as shown below:

IN THE SPECIFICATION

Column 1, line 36, after "properly" insert a period (.)

line 66, change "numbers" to -- numerals --

Column 2, line 4, correct the spelling of "form"

line 7, change "position" to -- portion -- line 50, change "14" to -- 16 -- line 50, change "16" to -- 14 --

Column 4, line 16, change "$R_2$" to -- $R_{21}$ --

Column 6, line 3, change "casing" to -- causing --

Column 8, line 11, delete "blow"

line 11, insert -- blow -- after "each"

line 52, change "$C_1$" to -- $CL_1$ --

Column 9, line 59, change "0" to -- at -- line 70, change "$CL_{15}$" to -- $C_{15}$ --

3,604,904

(2)

Column 10, line 7, change "$C_B$" to -- $C_{13}$ -- line 11, after "conducting" (1st occurrence) insert a period (.)

line 17, change "SCCR" to -- SCR -- line 32, change the comma (,) (2nd occurrence) to a period (.)

IN THE CLAIMS

Column 10, line 74, change "5" to -- 1 --

Column 11, line 42, change "comprises" to -- comprising --

Column 11, line 50, change "hen" to -- when --

Signed and sealed this 28th day of March 1972.

(SEAL)
Attest:

EDWARD M. FLETCHER, JR.
Attesting Officer

ROBERT GOTTSCHALK
Commissioner of Patents